United States Patent
Lucy

(10) Patent No.: US 6,530,584 B1
(45) Date of Patent: Mar. 11, 2003

(54) HAND TRUCK WITH SELECTIVELY MOVEABLE ARMS

(76) Inventor: Patrick C. Lucy, 1B S. County Rd. 107, Parks, AZ (US) 86018

(*) Notice: Subject to any disclaimer, the term of this patent is extended or adjusted under 35 U.S.C. 154(b) by 0 days.

(21) Appl. No.: 09/966,513

(22) Filed: Sep. 28, 2001

(51) Int. Cl.⁷ ................................................ B62B 1/00
(52) U.S. Cl. ..................... 280/47.29; 414/451
(58) Field of Search ................ 280/47.131, 47.17, 280/47.18, 47.23, 47.24, 47.27, 47.28, 47.29, 79.4, 79.5; 414/444, 450, 451, 490; 294/119.1; D34/12, 26, 24

(56) References Cited

U.S. PATENT DOCUMENTS

| | | | |
|---|---|---|---|
| 979,053 A | 12/1910 | Archibald | |
| 986,585 A | * 3/1911 | Moore | 414/451 |
| 990,187 A | 4/1911 | Bergsather | |
| 1,083,982 A | 1/1914 | Blessing | |
| 1,165,507 A | 12/1915 | Hovde | |
| 1,397,719 A | 11/1921 | Bryan | |
| 1,502,057 A | 7/1924 | Piper | |
| 1,551,928 A | 9/1925 | Bryan | |
| 1,795,856 A | * 3/1931 | Gravatt | 414/451 |
| 1,801,971 A | 4/1931 | Norling | |
| 1,862,299 A | * 7/1932 | Ciccone | 414/451 |
| 1,971,952 A | 8/1934 | Townsend | |
| 2,109,305 A | 2/1938 | Stine | |
| D110,110 S | * 6/1938 | Eagleson | D34/26 |
| 2,292,605 A | 8/1942 | Brase | |
| 2,312,461 A | 3/1943 | Woods | |
| 2,316,614 A | 4/1943 | Pierce | |
| 2,328,224 A | 8/1943 | Moorehead | |
| 2,367,752 A | 1/1945 | Broome | |
| 2,475,874 A | 7/1949 | Bartlett | |
| 2,485,545 A | 10/1949 | Bishop | |
| 2,500,047 A | 3/1950 | Smith | |
| 2,592,644 A | 5/1952 | Bartlett | |
| 2,794,564 A | 6/1957 | Frieburger | |
| 3,045,847 A | * 7/1962 | Fisher | 414/444 |
| 3,084,820 A | 4/1963 | Malo | |
| 3,425,575 A | 2/1969 | Crawford | |
| 3,499,658 A | 3/1970 | Fernholz et al. | |
| 4,685,854 A | * 8/1987 | Bulle | 414/452 |
| 5,026,078 A | * 6/1991 | Pinckney | 280/5.2 |
| D327,761 S | * 7/1992 | Stanfield | D34/26 |
| 5,427,493 A | 6/1995 | Lucy | |

* cited by examiner

Primary Examiner—Brian L. Johnson
Assistant Examiner—Bryan Fischmann
(74) Attorney, Agent, or Firm—Haugen Law Firm PLLP

(57) ABSTRACT

A mobile hand truck device for transporting objects loaded thereon, includes a frame having first and second upstanding side members and one or more cross members extending therebetween the first and second upstanding members, a guide support structure extending between respective lower portions of the first and second upstanding side members, a plurality of gripping arms operably coupled to the guide support structure, the gripping arms extending outwardly from the frame in a substantially horizontally opposed relationship with one another, and an expansion/contraction mechanism operably coupled to the gripping arms for slidably directing the gripping arms along the guide support structure, which expansion/contraction mechanism is adapted to simultaneously slide respective gripping arms in opposing directions along the guide support structure.

10 Claims, 5 Drawing Sheets

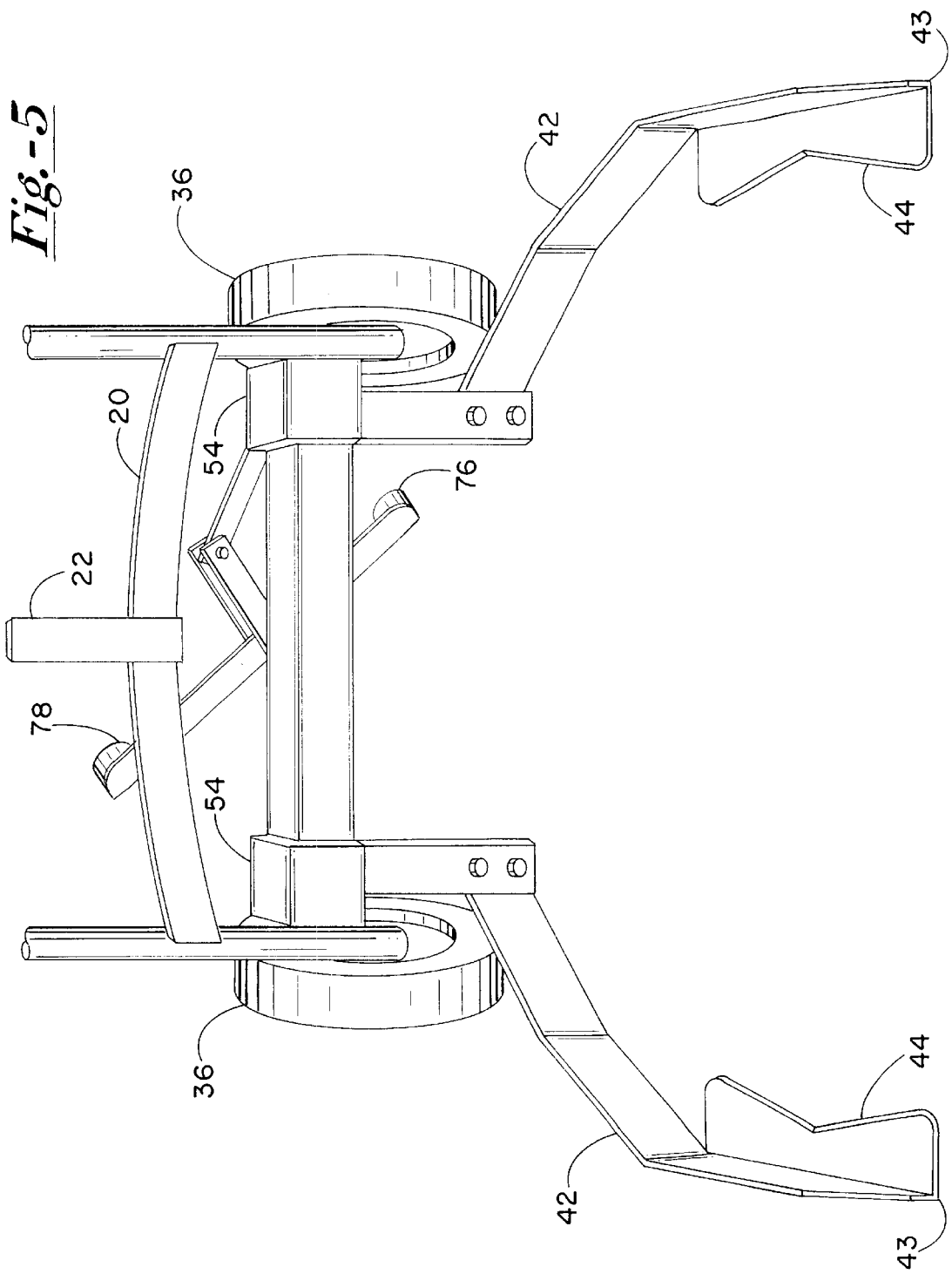

HAND TRUCK WITH SELECTIVELY MOVEABLE ARMS

FIELD OF THE INVENTION

The present invention relates to portable object-carrying devices generally, and more particularly to hand trucks having means for selectively adjusting spacing between opposing load-bearing gripping arms. This invention also relates to methods for selectively adjusting hand truck gripping arms.

BACKGROUND OF THE INVENTION

Various object-carrying devices have been designed and implemented over the years for assisting a user in carrying and transporting objects. Most often, such objects are either too heavy or too large to be easily carried by a single user. Therefore, object-carrying devices utilizing wheels or other movement facilitators have been implemented for efficiently carrying such objects. In many applications, the object-carrying devices are used to carry a stack of objects which may not be easily manipulated to load onto the object-carrying devices. Thus, a coordinated effort from multiple users is sometimes required to properly load the objects on the object-carrying devices.

An additional difficulty in standard object-carrying devices, more commonly referred to as hand trucks, is stabilizing the loaded objects onto the hand truck. In many commonly-used designs, hand trucks incorporate a load-bearing extension of fixed dimension extending from the upright frame of the hand truck. Therefore, relatively larger or irregularly-shaped objects may be unstable when loaded onto the respective hand truck support structures. To remedy this situation, some hand truck manufacturers have developed load-engaging arms which move along various axes to thereby engage and disengage various-sized objects constituting the load. The systems developed to date, however, fail to utilize a simple and convenient means for engaging and disengaging objects with respective engaging arms.

It is therefore a principle object of the present invention to provide a convenient and efficient means for selectively engaging and disengaging various-sized objects to an object-carrying device such as a hand truck.

It is another object of the present invention to provide an object-carrying device such as a hand truck which incorporates selectively expandable and contractible engaging means for engaging objects as a load on the hand truck device, which engaging means is easily and efficiently operated by a single user.

It is a still further object of the present invention to provide a hand truck device having a plurality of gripping arms for selectively engaging desired objects, which gripping arms are slidably actuated along an axis through the use of remote actuation means.

It is a yet further object of the present invention to provide actuation means operably coupled to a plurality of gripping arms extending from a hand truck device for selectively engaging and disengaging various objects to the hand truck, wherein the actuation means may be manipulated to move the gripping arms in opposing directions to thereby accomplish expansion or contraction of the space between the gripping arms.

Another object of the present invention is to provide a user-operated expansion/contraction means operably coupled to a hand truck device for selectively engaging and disengaging one or more vehicular tires to the associated hand truck.

SUMMARY OF THE INVENTION

By means of the present invention, an improved object-carrying device such as a hand truck is provided for easily and efficiently engaging objects to the object-carrying device for transportation thereon. The hand truck device of the present invention provides a means for easily expanding and contracting the space between generally opposing gripping arms to thereby engage various objects for transport without assistance from additional hand truck device users.

One embodiment of the mobile hand truck device of the present invention includes a frame having first and second upstanding side members and one or more cross members extending therebetween, and connected to, the first and second upstanding members. The hand truck device further includes a guide support structure extending between respective lower portions of the first and second upstanding side members, and a plurality of gripping arms operably coupled to the guide support structure, with the gripping arms extending outwardly from the frame in substantially horizontally opposed relationship with one another. To move the gripping arms, expansion/contraction means operably coupled to the gripping arms are provided for slidably directing the gripping arms along the guide support structure, with the expansion/contraction means being adapted to simultaneously slide respective gripping arms in opposing directions along the guide support structure. Actuation means are further provided for actuating the expansion/contraction means, and movement facilitators operably coupled to the frame and disposed adjacent to the lower portions of the first and second upstanding side members are also provided on the hand truck device.

The mobile hand truck device may also include a first upstanding rib member disposed between the first and second upstanding side members, wherein the one or more cross members are preferably connected to the upstanding rib member for structural support of the hand truck device.

The mobile hand truck device preferably includes gripping arm guides operably coupled to both the guide support structure and the gripping arms, wherein the gripping arm guides are adapted to act as interfaces between the respective gripping arms and the guide support structure. The gripping arm guides are preferably manipulated by the expansion/contraction means through expandable arm means which are adapted to laterally extend and retract the gripping arm guides along the guide support structure. Preferably, the actuation means for actuating the expansion/contraction means includes an integrally-formed foot pedal.

BRIEF DESCRIPTION OF THE DRAWINGS

FIG. 5 is a front view of a lower portion of the hand truck device as illustrated in FIG. 1.

DETAILED DESCRIPTION OF THE PREFERRED EMBODIMENTS

The objects and advantages enumerated above together with other objects, features, and advances represented by the present invention will now be presented in terms of detailed embodiments described with reference to the attached drawing figures which are intended to be representative of various possible configurations of the invention. Other embodiments and aspects of the invention are recognized as being within the grasp of those having ordinary skill in the art.

Figure 1:
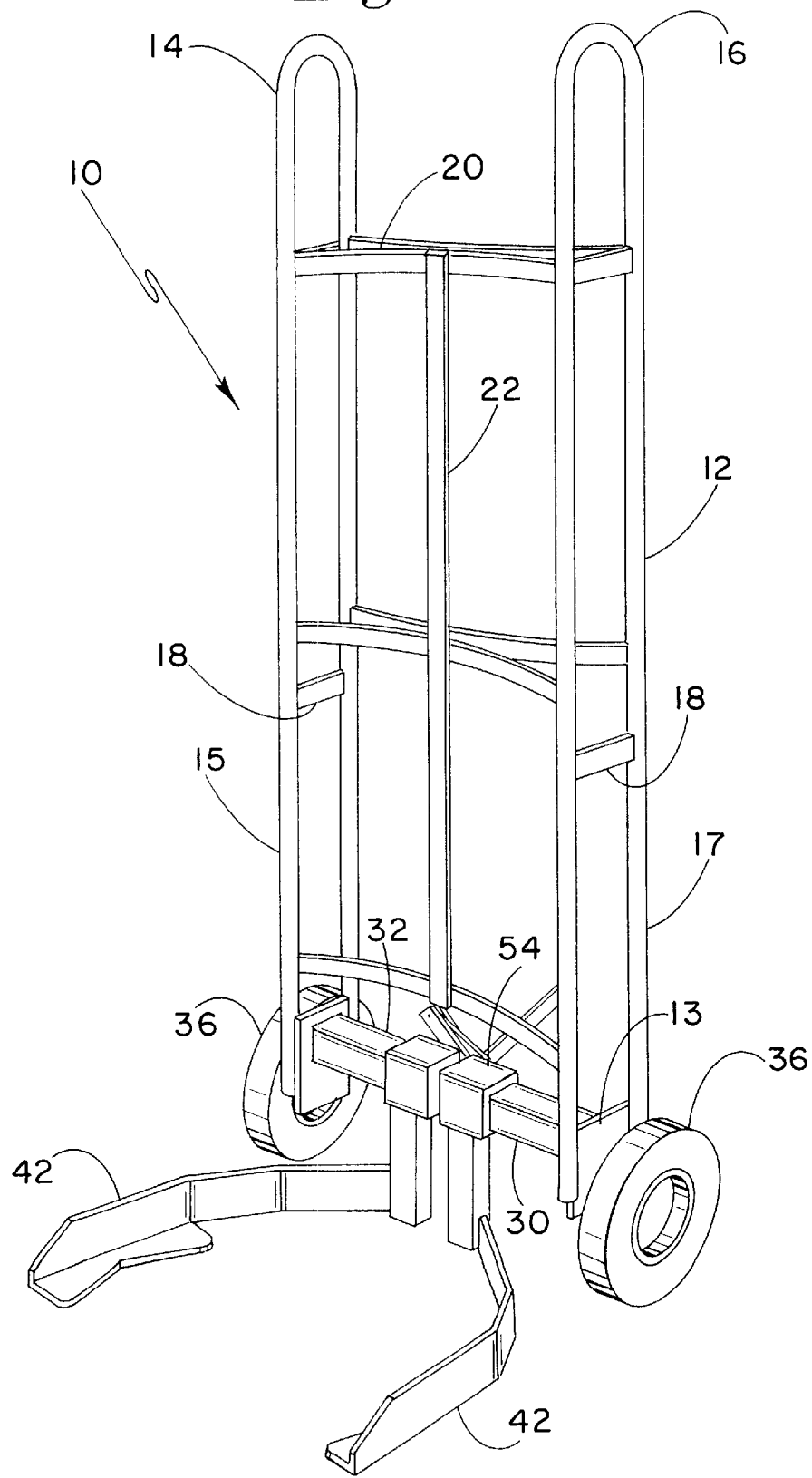
FIG. 1 is a perspective view of a hand truck device in accordance with the present invention.

Referring now by characters of reference to the drawings, and first to FIG. 1, a hand truck 10 of the present invention is shown. Hand truck 10 preferably includes an upright frame 12 having first and second upstanding side members 14, 16 disposed in substantially parallel relationship to one another. First and second side members 14, 16 may be a solid structure, or may each include a plurality of distinct members which are joined together by support joists 18 as shown in FIG. 1. Frame 12 further includes one or more cross members 20 extending between side members 14, 16 for structural support thereof. A guide support structure 30 is preferably disposed between respective side members 14, 16 at a lower portion 13 of frame 12. Guide support structure 30 is preferably operably coupled to one or more movement facilitators 36, which movement facilitators 36 are disposed at respective distal end portions 32 of guide support structure 30.

As shown in FIG. 1, movement facilitators 36 are preferably disposed adjacent to respective outer surfaces 15, 17 of side members 14, 16. As such, movement facilitators 36 may alternatively be operably coupled to upstanding side members 14, 16, or in combination with guide support structure 30. In the embodiment illustrated in FIG. 1, distal end portions 32 of guide support structure 30 are preferably disposed at outer surfaces 15, 17 of side members 14, 16. In such a manner, movement facilitators 36 are operably coupled to respective distal end portions 32 of guide support structure 30, and are therefore integrally disposed therewith. Movement facilitators 36 are preferably wheels, which may be solid or pneumatic in construction. Other forms of movement facilitators 36 are also contemplated by the present invention, including moving tracks, or the like.

Frame 12 preferably includes an upstanding rib member 22 interposed between side members 14, 16. Rib member 22 preferably provide structural support to frame 12, in that cross members connect thereto. Cross members 20 may be specifically configured to conform to desired shapes, and may form a curvilinear support by extending between respective side members 14, 16 and connecting to rib member 22, which rib member 22 may be offset rearwardly from a plane containing side members 14, 16. As shown in FIG. 1, however, rib member 22 may be offset rearwardly only from frontwardly disposed members of respective side members 14, 16.

Hand truck 10 further includes gripping arms 42 operably coupled to guide support structure 30. Gripping arms 42 may be formed in a variety of configurations, though a generally opposing relationship with one another is preferred. In the embodiment illustrated in FIG. 1, gripping arms 42 each have an arcuate configuration, whereby cylindrically-shaped objects may be more efficiently carried thereby. Other configurations for gripping arms 42, however, are also contemplated by the present invention for desired workability in particular applications.

Gripping arms 42 are preferably coupled to guide support structure 30 via gripping arm guides 54. Gripping arm guides 54 are preferably slidably coupled to guide support structure 30, such that sliding motion of gripping arm guides 54 along guide support structure 30 correspondingly moves gripping arms 42 in a direction parallel to guide support structure 30. As may be seen more clearly in FIG. 2, gripping arm guides 54 are at least partially circumferentially disposed about guide support structure 30, and, as such, slidably move along an axis defined by guide support structure 30.

To reduce sliding friction between gripping arm guides 54 and guide support structure 30, nylon inserts 58 may be disposed between the gripping arm guides 54 and guide support structure 30. In such a manner, the interface between gripping arm guide 54 and support structure 30 has a reduced-friction surface in nylon inserts 58. In another embodiment of the invention, guide support structure 30 may be coated with a reduced friction surface such as nylon, Teflon, or other such material which acts to reduce the impedance to the slidability of gripping arm guides 54 along guide support structure 30.

Figure 2:
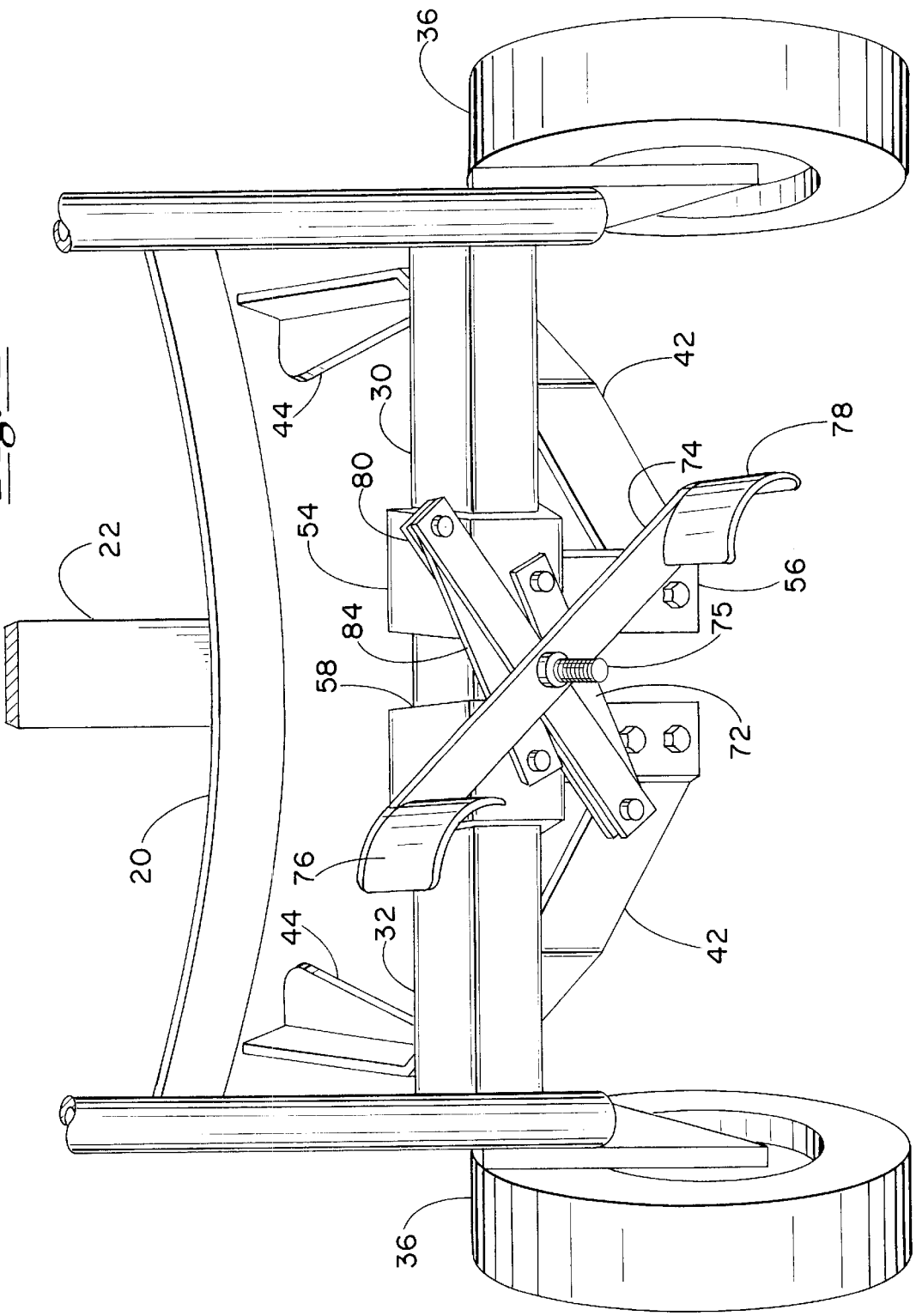
FIG. 2 is a rear view of a lower portion of the hand truck device illustrated in FIG. 1.

In some embodiments of the present invention, gripping arms 42 may be coupled to gripping arm guides 54 via connector structures 56, which connector structures 56 depend downwardly from gripping arm guides 54 to thereby allow gripping arms 42 to be mounted thereto in a plane below guide support structure 30. Connector structures 56 may be formed integrally with gripping arm guides 54, or may be separate structures connected to gripping arm guides 54 through permanent attachment means, such as welding or soldering. As shown in FIG. 2, gripping arms 42 may be secured to connector structure 56 via fasteners such as bolts, rivets, or cotter key bolt systems. In some embodiments, however, gripping arms 42 are formed integrally with connector structure 56, or may be permanently secured thereto attachment means such as welding, soldering, or the like.

With attention being drawn to FIG. 2, expansion/contraction means 72 is shown. In preferred embodiments, expansion/contraction means 72 generally comprises a rotatable foot pedal 74 which is intimately secured to a control bar 80, which control bar 80 is operably coupled to respective push rods 84. Foot pedal 74 is preferably rotatable about a centrally-disposed rod 75, which may be threaded. Rod 75 defines the axis of rotation for foot pedal 74, and is formed from a sufficiently strong material so as to withstand downward forces generated during rotation of foot pedal 74.

Foot pedal 74 is particularly configured to perform as an actuation means, whereby downward force and movement upon expansion brace 76 rotates foot pedal 74 in a counter-clockwise direction, which correspondingly causes control bar 80 to likewise rotate in a counter-clockwise direction. Rotation of control bar 80 acts to apply lateral forces against push rods 84, such that respective gripping arm guides 54, which are operably connected to push rods 84, slidably move along guide support structure 30 toward respective distal ends 32 thereof. Push rods 84 thereby act as expandable arm means to laterally extend and retract gripping arm guides 54 along guide support structure 30. Therefore, continued clockwise rotation of foot pedal 74 and control bar 80 correspondingly results in continued outward movement of gripping arm guides 54 along guide support structure 30. Such outward movement results in the expansion of space between respective opposing gripping arms 42. In such a manner, spacing between respective gripping arms 42 may be user-defined through graduated rotation of foot pedal 74 and control bar 80 of expansion/contraction means 72.

Figure 3:
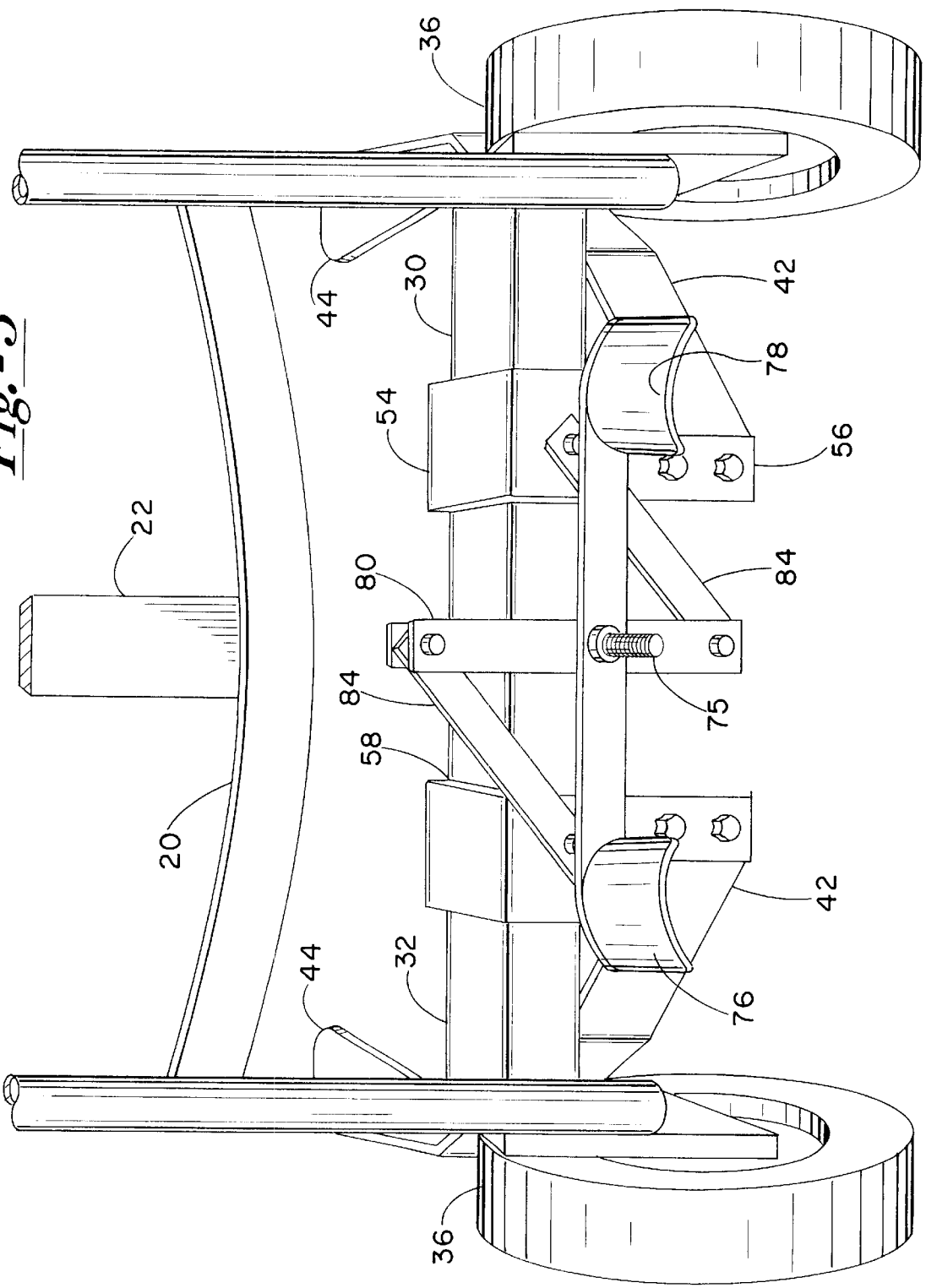
FIG. 3 is a rear view of a lower portion of the hand truck illustrated in FIG. 1 showing the expansion/contraction means being actuated to a desired degree.
Figure 4:
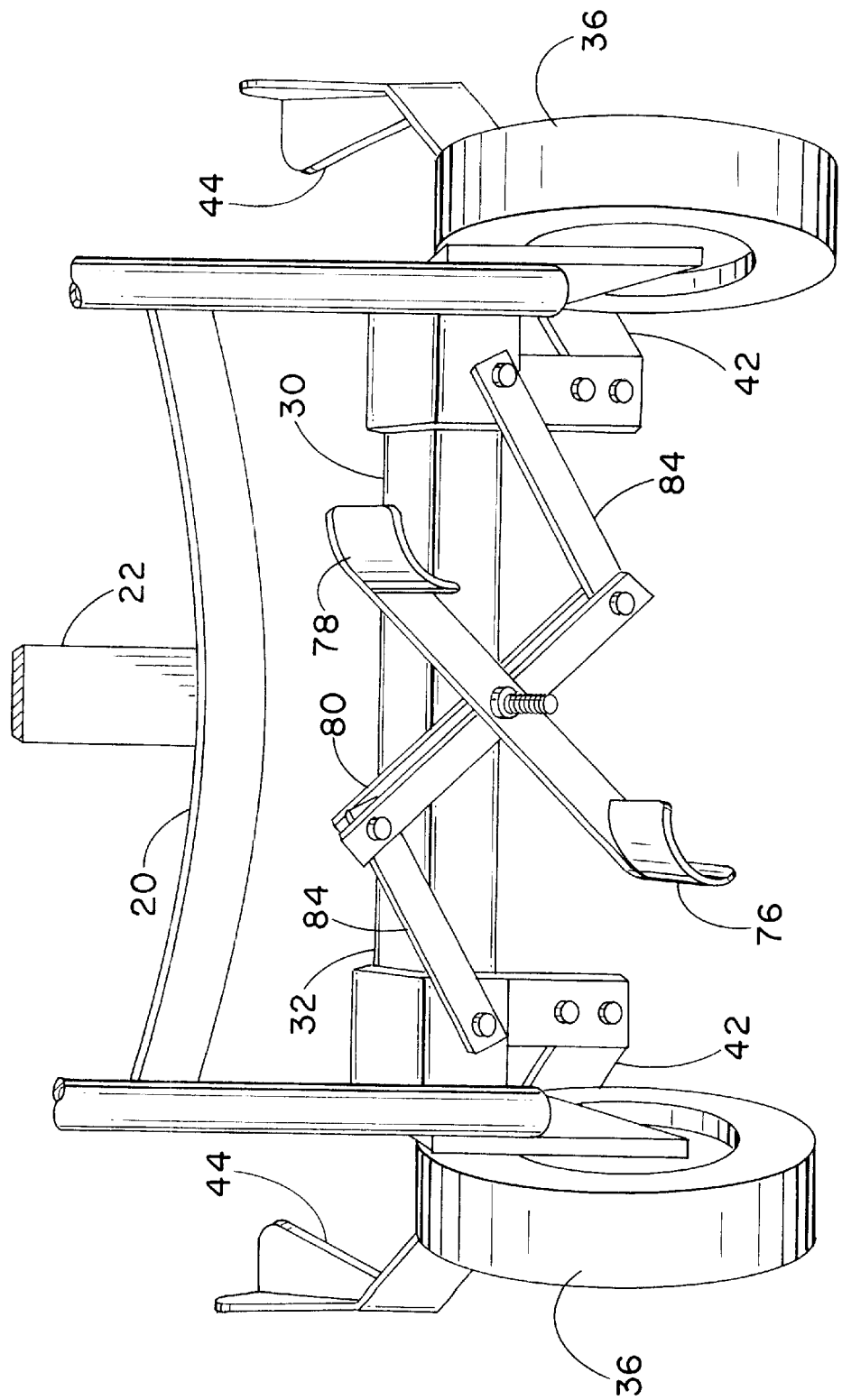
FIG. 4 is a rear view of the lower portion of the hand truck illustrated in FIG. 1 with the expansion/contraction means being actuated to a full extent.

Such graduated expansion of the spacing between opposing gripping arms 42 may be seen in the progression illustrated by FIGS. 2–4. As illustrated in FIG. 3, expansion brace 76 has been depressed downwardly such that foot pedal 74 and control bar 80 have been rotated in a counterclockwise direction. Further rotation thereof results in the configuration as depicted in FIG. 4, with respective gripping arm guides 54 being maximally outwardly moved into adjacent disposition with respective side members 14, 16. To reverse this expansion process, downward pressure on contraction brace 78 results in clockwise rotation of foot pedal 74 and control bar 80, thereby inwardly moving gripping arm guides 54 along guide support structure 30, and, consequently, contracting the space between respective gripping arms 42. In such a manner, a single user may efficiently and easily expand and contract the spacing between respective gripping arms 42 to thereby engage and disengage various objects to be carried by hand truck device 10.

As shown in FIG. 5, gripping arms 42 preferably include respective flange portions 44 extending perpendicularly inwardly from a lower portion 43 of gripping arms 42. Flange portions 44 preferably assist in engaging various objects, and in providing support for loads placed thereon. In a particular example, one or more tires may be engaged by gripping arms 42 of hand truck device 10. In such an example, flange portions 44 provide support from beneath the one or more tires, such that hand truck device 10 may be tilted backwards to thereby elevate the one or more tires from a ground surface for subsequent transportation by the hand truck device. Flange portions 44 may extend the entire length of respective gripping arms 42, or may extend over only a portion of the length thereof.

The components comprising hand truck device 10 are preferably durable and strong for maintaining integrity through and transporting various objects. Exemplary materials include, for example, steel, iron, aluminum, and various metallic alloys. As has been discussed in some detail hereinabove, elements making up the present invention may be formed separately or integrally, whereby individual components may be connected to one another through the use of various attachment means including, but not limited to, welding, soldering, or other fastening means such as bolts, cotter pin systems, rivets, and the like.

In a particular application of the present invention, a user orients the hand truck device 10 immediately adjacent the object or objects to be transported. By actuating expansion/contraction means 72 a desired degree, the user operably expands the respective gripping arms 42 to a desired spacing therebetween which is slightly wider than the object or objects to be carried. Hand truck device 10 is then moved into a position such that gripping arms 42 at least partially surround the targeted objects. The expansion/contraction means 72 are then actuated by the user by rotating foot pedal 74 in a clockwise manner to thereby contract gripping arms 42 toward one another, and thereby engage the object or objects to be transported. Hand truck device 10 is then tilted backward such that gripping arms 42 and the load thereon are elevated above the floor surface.

In preferred embodiments of the present invention, gripping arm guides 54 are configured about guide support structure 30 such that imposition of a load upon gripping arms 42 correspondingly "locks" gripping arm guides 54 in place. Such a locking mechanism is brought about by the twisting or torquing moment developed by downward pressure on respective gripping arms 42, which downward pressure is transformed into a rotating moment about an axis defined by the interior of gripping arm guides 54. Rotational forces upon gripping arm guides 54 act to bind the gripping arm guides 54 to the interiorly disposed guide support structure 30, thereby locking gripping arm guides 54 in place about guide support structure 30. Therefore, gripping arms 42 are automatically held stationary when a load is placed thereon, such that the load engaged by gripping arms 42 will remain stable.

A distinct advantage introduced by the present invention is the ability for a single user to easily and efficiently move respective gripping arms 42 with respect to one another, such that loads of various configurations may be engaged in a stable manner without the assistance of multiple users. In addition, the "locking" mechanism obtained by the specific configuration of gripping arm guides 54 as disposed about guide support structure 30 prevents instability during transportation of loads carried by hand truck device 10.

The invention has been described herein in considerable detail in order to comply with the patent statutes, and to provide those skilled in the art with the information needed to apply the novel principles and to construct and use embodiments of the invention as required. However, it is to be understood that the invention can be carried out by specifically different devices and that various modifications can be accomplished without departing from the scope of the invention itself.

What is claimed is:

1. A mobile hand truck device for transporting objects loaded thereon, said hand truck device comprising:
    (a) a frame having first and second upstanding side members and one or more cross members extending between said first and second upstanding members;
    (b) a guide support structure extending between respective lower portions of said first and second upstanding side members;
    (c) a plurality of gripping arm guides operably coupled to and at least partially circumferentially surrounding a portion of said guide support structure;
    (d) a plurality of gripping arms operably coupled to said gripping arm guides such that said gripping arm guides are adapted to act as interfaces between respective gripping arms and said guide support structure, said gripping arm guides being specifically configured and disposed about said guide support structure so as to automatically lock in place about said guide support structure upon imposition of a load on said gripping arms, said gripping arms extending outwardly from said frame in a substantially horizontally opposed relationship with one another;
    (e) expansion/contraction means operably coupled to said gripping arm guides for slidably directing said gripping arm guides along said guide support structure, said expansion/contraction means being adapted to simultaneously slide respective gripping arm guides in opposing directions along said guide support structure, said expansion/contraction means including a rotatable foot pedal bar fixedly secured to a control bar substantially at respective central pivot axes thereof, said control bar being specifically configured and oriented in said expansion/contraction means to maximize translation of torque generated by downward force on respective distal ends of said foot pedal bar into opposed horizontal force vectors to thereby efficiently slide said gripping arm guides along said guide support structure;
    (f) actuation means for actuating said expansion/contraction means; and
    (g) movement facilitators operably coupled to said frame and disposed adjacent to said lower portions of said first and second upstanding members.

2. A mobile hand truck device as in claim 1, including a first upstanding rib member disposed between said first and second upstanding side members, said first upstanding rib member being offset behind a plane containing said first and second upstanding members.

3. A mobile hand truck device as in claim 2 wherein said cross members are connected to said first upstanding rib member.

4. A mobile hand truck device as in claim 1 wherein said gripping arm guides are formed integrally with respective said gripping arms.

5. A mobile hand truck device as in claim 1, including a low-friction material interposed between said gripping arm guides and said guide support structure.

6. A mobile hand truck device as in claim 5 wherein said low-friction material is formed as an insert element disposed about an interior circumference of said gripping arm guides.

7. A mobile hand truck device as in claim 1 wherein said gripping arms include a flange extending perpendicularly outwardly from a lower portion thereof.

8. A mobile hand truck device as in claim 1 wherein said expansion/contraction means include expandable arm means, said expandable arm means being adapted to laterally extend and retract said gripping arm guides along said guide support structure.

9. A mobile hand truck device as in claim 1 wherein said actuation means comprise an integrally-formed foot pedal.

10. A mobile hand truck device as in claim 1 wherein said movement facilitators comprise wheels.

* * * * *